US007717339B2

(12) United States Patent
Ito

(10) Patent No.: US 7,717,339 B2
(45) Date of Patent: May 18, 2010

(54) PRINTING APPARATUS AND PRINTING METHOD

(75) Inventor: Shigeru Ito, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 885 days.

(21) Appl. No.: 11/377,386

(22) Filed: Mar. 17, 2006

(65) Prior Publication Data

US 2006/0219784 A1 Oct. 5, 2006

(30) Foreign Application Priority Data

Apr. 1, 2005 (JP) ............................. 2005-106401

(51) Int. Cl.
*G06F 3/12* (2006.01)

(52) U.S. Cl. ........................ 235/432; 235/451; 235/492

(58) Field of Classification Search ................. 235/432, 235/451, 492, 380
See application file for complete search history.

(56) References Cited

U.S. PATENT DOCUMENTS

| | | | | |
|---|---|---|---|---|
| 6,655,287 | B2 | 12/2003 | Jojima et al. | |
| 2004/0134994 | A1 * | 7/2004 | Zaba et al. | 235/492 |

FOREIGN PATENT DOCUMENTS

| | | | |
|---|---|---|---|
| EP | 1 260 944 A2 | | 11/2002 |
| JP | 2002-002154 | | 1/2002 |
| JP | 2005-2154 | | 1/2002 |
| JP | 02002074291 | * | 3/2002 |
| JP | 2002-99945 | | 4/2002 |
| JP | 2003-94701 | | 4/2003 |
| JP | 2003-99718 | | 4/2003 |
| JP | 2003-145816 | | 5/2003 |
| JP | 3465100 B2 | | 8/2003 |
| JP | 3465110 | | 8/2003 |
| JP | 2004-142188 | | 5/2004 |
| JP | 2005-56047 | | 3/2005 |
| JP | 2005-74668 | | 3/2005 |

OTHER PUBLICATIONS

European Search Report dated May 16, 2007 for Appln. No. 06004648.9-1251.

* cited by examiner

*Primary Examiner*—Ahshik Kim
(74) *Attorney, Agent, or Firm*—Pillsbury Winthrop Shaw Pittman, LLP

(57) ABSTRACT

A passbook printing apparatus prints a color face image and private information of the owner of a passbook in the passbook with a built-in IC chip including a passbook number recorded previously. In this time, the passbook printing apparatus first reads the passbook number from the IC chip built in the passbook, creates private information including the read passbook number, face image of the owner and printing information, and prints the printing information reflecting the passbook number read from the IC chip on a printing page of the passbook.

9 Claims, 7 Drawing Sheets

PRINTING APPARATUS AND PRINTING METHOD

CROSS-REFERENCE TO RELATED APPLICATIONS

This application is based upon and claims the benefit of priority from prior Japanese Patent Application No. 2005-106401, filed Apr. 1, 2005, the entire contents of which are incorporated herein by reference.

BACKGROUND OF THE INVENTION

1. Field of the Invention

The present invention relates to a printing apparatus, which prints a face image and private information of an owner on a medium, such as an ID card for personal authentication and passbook with a built-in memory for wireless data reading/writing, and a printing method.

2. Description of the Related Art

There is a known printing apparatus, which prints a face image and private information of an owner on a passbook with an IC to permit wireless data reading and wring data. (For example, refer to Jpn. Pat. Appln. KOKAI No. 2002-2154.) As a passbook printing apparatus of this kind, an apparatus using an intermediate transfer film is known. (For example, refer to Published Japanese Patent No. 3465110 and Jpn. Pat. Appln. KOKAI No. 2003-94701.)

A passbook printing apparatus using an intermediate transfer film has a printer, a transfer unit, and a reader/writer. In this apparatus, the printer prints a face image and character information on an image-receiving layer of the intermediate transfer film, the transfer unit thermally transfers the image-receiving layer of the intermediate transfer film to a printing surface of a passbook, and the reader/writer unit writes necessary data in an IC chip. Namely, this apparatus writes data in the IC chip after printing information on the printing surface of a passbook.

Thus, this apparatus cannot read previously written from the IC chip and reflect it on data to be printed on the printing surface of a passbook.

If the IC chip is found defective when writing data in the IC chip after printing the data on the printing surface, it is unknown whether the IC chip was broken from the beginning or broken in the passbook printing apparatus. In this case, the cause of the defect of the IC chip is unknown, and the responsibility is unclear.

In this case, the passbook is abandoned, and the intermediate transfer film and ink ribbon used for the printing are wasted. Besides, the abandoned passbook includes the printed private information, and must be carefully handled from the viewpoint of protection of private information.

Further, the above passbook printing apparatus cannot use data other than the information previously printed in a passbook, and security information to be printed on a passbook can be created only from visible information.

BRIEF SUMMARY OF THE INVENTION

It is an object of the present invention to provide a printing apparatus and method, which can increase invisibility of printing information and decrease a running cost.

In order to achieve the above object, according to an aspect of the present invention, there is provided a printing apparatus comprising a reader which reads identifying information specific to a printing medium from a memory built in the printing medium, and a printer which prints printing information including the identifying information read by the reader on the printing medium.

According to another aspect of the present invention, there is provided a printing apparatus comprising a reader which reads identifying information specific to a printing medium from a memory built in the printing medium, a printing information generator which generates printing information including the identifying information read by the reader, and a printer which prints the printing information generated by the printing information generator in the printing medium.

According to still another aspect of the present invention, there is provided a printing method comprising a step of reading identifying information specific to a printing medium from a memory built in the printing medium, and a step of printing printing information including the identifying information read in the reading step on the printing medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be explained with reference to the accompanying drawings.

Figure 1:
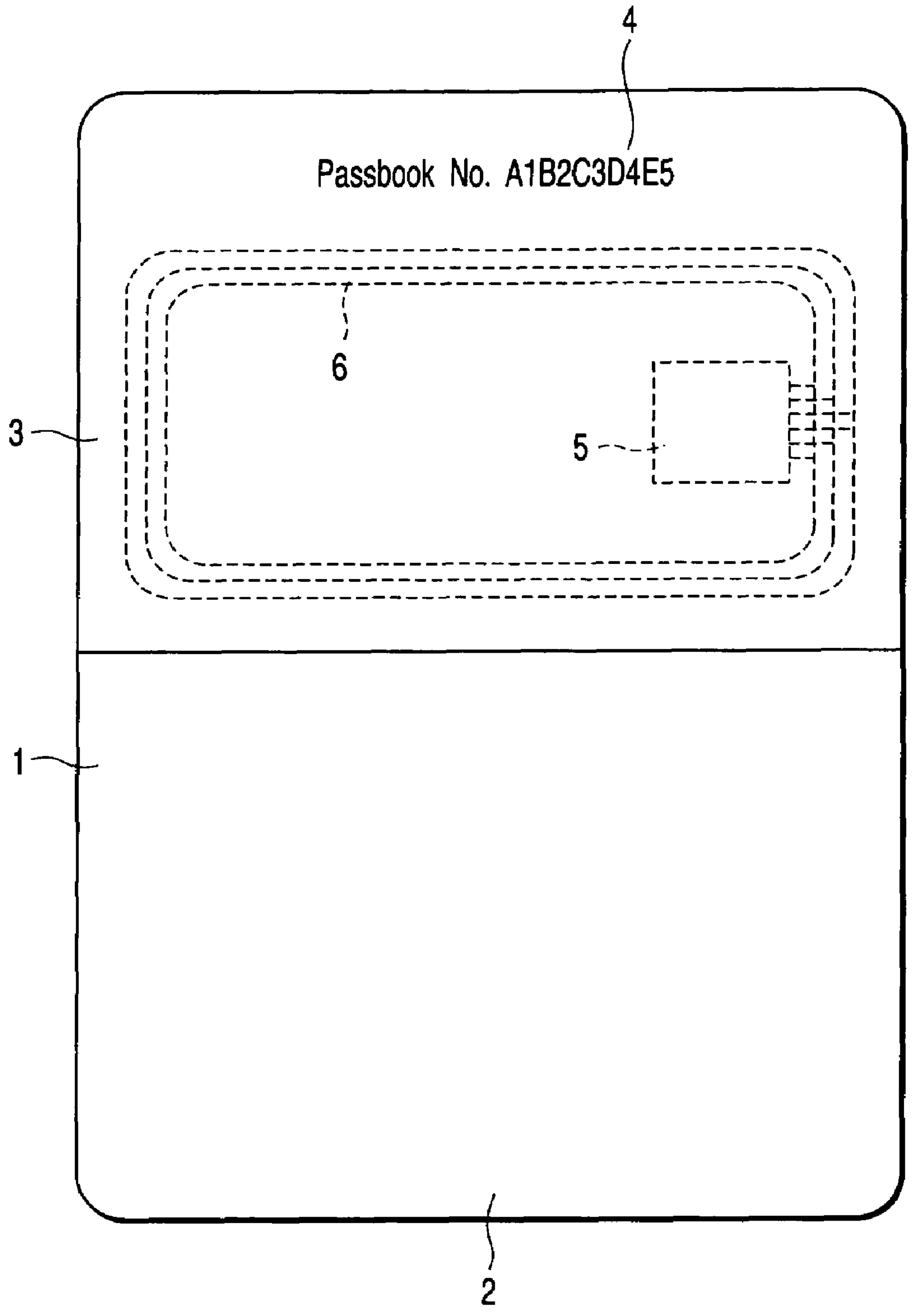
FIG. 1 is a schematic illustration showing a passbook with a front cover opened.

FIG. 1 shows an unused passbook 1 with a printing page 2 (printing surface) opened, as an example of printing medium before printing information. In this embodiment, a page next to a front cover 3 is allocated to the printing page 2. The front cover 3 has a previously printed passbook number 4, for example, as identifying information specific to the passbook 1. The printing page 2 may be allocated to any page.

The front cover 3 has a buried IC chip 5 (memory) and antenna 6 for wireless data reading/writing and wireless communication with a reader/writer described later, respectively. The IC chip 5 includes at least the passbook number 4 of the passbook 1 written previously as electronic data. The IC chip 5 also includes other information such as a serial number of the passbook to identify the passbook written previously as invisible electronic data. The IC chip 5 and antenna 6 may be buried in other pages than the front cover 3.

Figure 2:
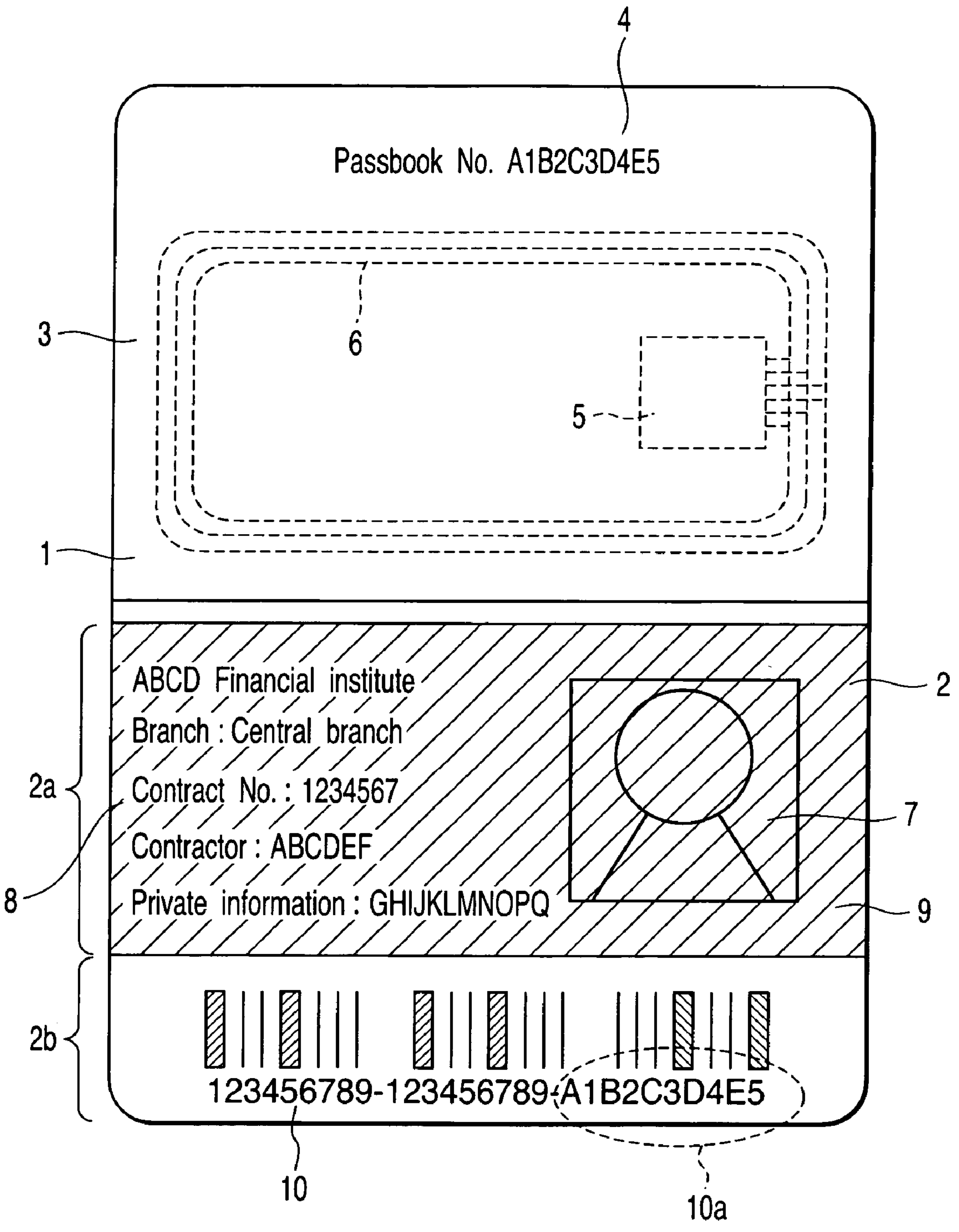
FIG. 2 is a schematic illustration showing the passbook of FIG. 1, with information printed on a printing page.

FIG. 2 shows the passbook 1 with information printed on the printing page 2. The passbook 1 has a printing area 2*a* to print a face image and private information of the owner, and a reading area 2*b* having previously printed bar code readable optically through a machine.

A face image 7 is printed in color and private information is printed in eight black characters in the printing area 2*a*. The printing area 2*a* printed with the face image 7 and character data 8 is coated with a protection film (shaded part) 9 given a transparent hologram layer having a specific pattern. The face image 7 and character data 8 are visible through the pattern of the transparent hologram layer.

In the reading area 2*b*, encrypted specific face image data is printed, for example. Further, character data such as private information and a bar code of a passbook number specific to the passbook 1 are printed in the area 2*b*. In the following explanation, data such as these encrypted face image and bar code data printed in the reading area 2*b* is called security information 10. The reading area 2*b* having previously printed security information 10 is coated with a plain transparent protection film.

Figure 3:
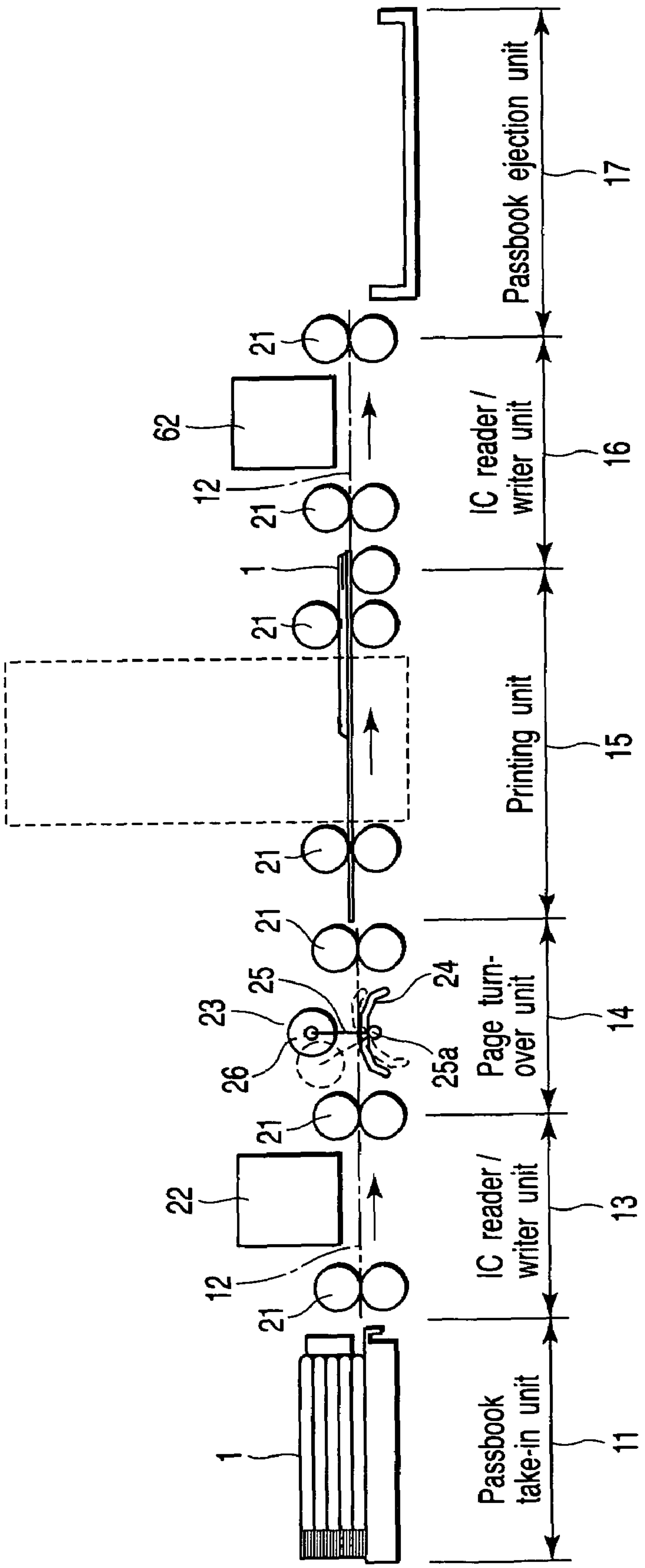
FIG. 3 is a schematic illustration showing a passbook printing apparatus according to an embodiment of the present invention.

FIG. 3 shows schematically the configuration of a passbook printing apparatus as an example of a printing apparatus according to an embodiment of the present invention. The passbook printing apparatus has a passbook take-in unit 11 to feed an object or the unused passbook 1 shown in FIG. 1 one by one, and a conveying path 12 to receive and convey the passbook 1 fed from the passbook take-in unit 11. On the conveying path 12, a wireless IC reader/writer unit 13 (a reading unit), a page turn-over unit 14, a printing unit 15 (a printer), a wireless IC reader/writer unit 16 (a writing unit), and a passbook ejection unit 17 are provided sequentially along the direction of feeding the passbook 1.

The passbook take-in unit 11 houses a closed passbook 1 in the state stacked in several numbers, feeds the passbooks 1 to the conveying path 12 one by one sequentially from the lowermost one, and takes in another unused passbook 1. The passbook 1 housed in the passbook take-in unit 11 is an unused book as shown in FIG. 1.

The wireless IC reader/writer unit 13 has feeding rollers 21 to hold and feed the passbook 1 through the conveying path 12. At the position above and separated from the conveying path 12, or at the position opposite to the outside surface of the front cover 3 of the passbook 1 having the buried IC chip 5, a wireless IC reader/writer 22 is provided for wireless data communication with the IC chip 5 through the antenna 6 buried in the front cover 3.

The page turn-over unit 14 has feeding rollers 21 to feed the passbook 1 fed from the wireless IC reader 13 to the conveying path 12 in both forward and backward directions, a turn-over mechanism 23 to open a desired page of the passbook 1, and a page detector (not shown) to identify the opened page of the passbook 1 by detecting a page mark given to the page of the passbook 1 opened by the turn-over mechanism 23.

The turn-over mechanism 23 has a backup plate 24 provided under the conveying path 12, a swing shaft 25 to swing about fulcrum 25*a* provided at the center of the swinging of the backup plate 24, and a turn-over roller 26 placed above the conveying path 12 and attached rotatably to the top end of the swing shaft 25. When the swing shaft 25 is swung by a not-shown motor to the position indicated by a broken line in the drawing, the turn-over roller 26 is swung and the backup plate 24 is swung interlocking with the motion of the roller 26. The turn-over roller 26 is rotatable clockwise or counterclockwise by a not-shown motor.

When turning over a page of the passbook with the turn-over mechanism 23, first convey the passbook 1 to a predetermined position in the turn-over mechanism 23 and stop there, and swing the swing shaft 25 to the left as indicated by a broken line in the drawing and press the turn-over roller 26 onto the passbook 1. In this time, the backup plate 24 is oscillated by the swing of the swing shaft 25, and the backside of the passbook 1 is pushed up by the inclined backup plate 24.

In this state, rotate the turn-over roller 26 pressed to a page of the passbook 1 on the upstream side of the conveying direction, and start turning over of the uppermost page of the passbook. When the page is swollen just like raised gradually and turned over by a certain extent, stop the rotation of the roller. Return the swing shaft 25 to the position indicated by a solid line in the drawing, and rotate again the turn-over roller 26, and turn over the page completely onto the roller 26.

Convey the passbook 1 in the upstream direction of the conveying direction, open completely the page turned over onto the turn-over roller 26, detect the page mark of the opened page by a not-shown page detector, and confirm the opened page. By the above operation, a desired page of the passbook 1 can be automatically opened, and the opened page can be confirmed. In this way, the passbook 1 with a desired page opened is conveyed to the printing unit 15.

A page of the passbook 1 can also be opened in the reverse direction by operating the turn-over mechanism 23 in the direction reverse to the above-mentioned operation.

Figure 4:
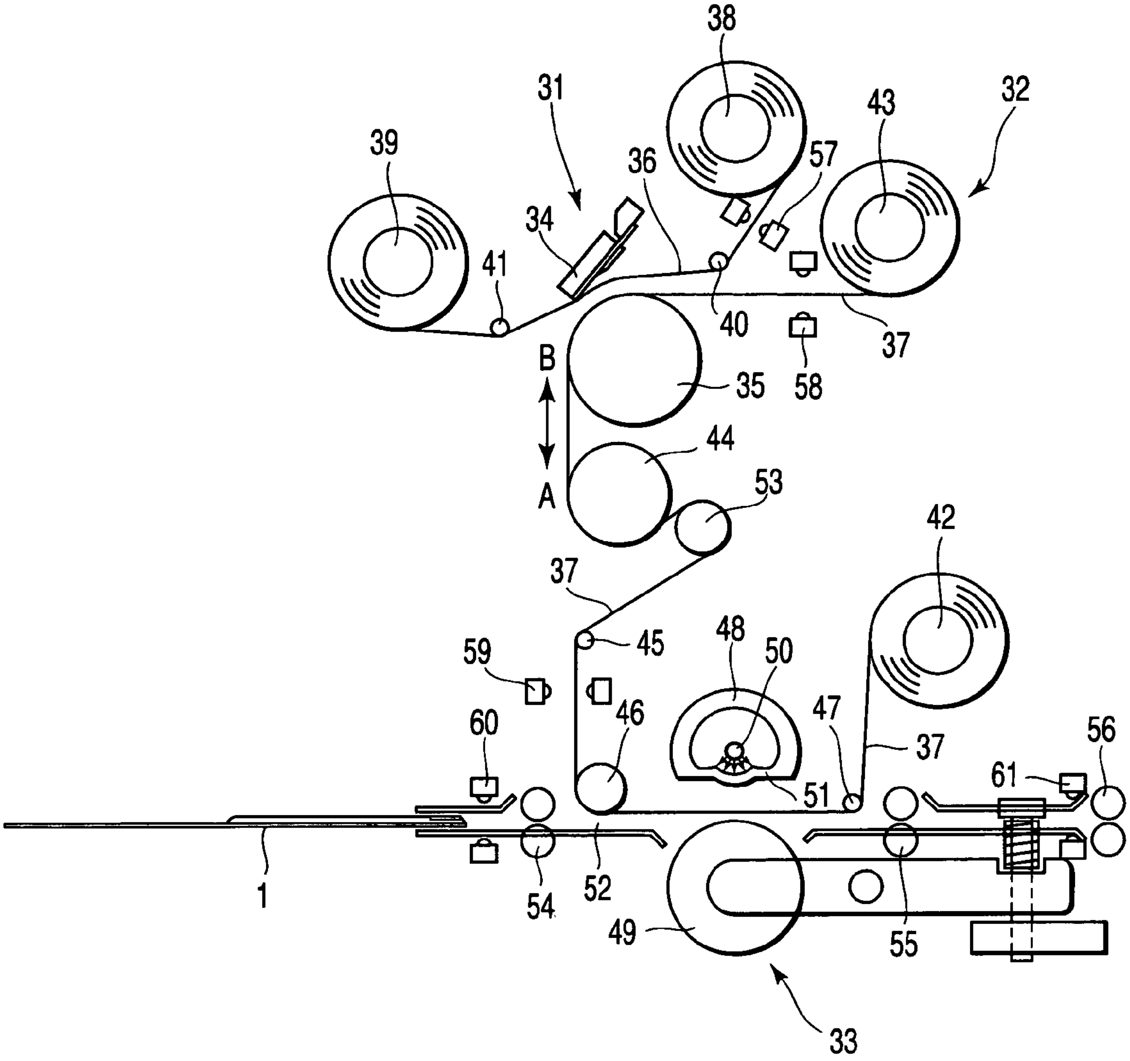
FIG. 4 is a schematic illustration showing the configuration of a printing unit incorporated in the passbook printing apparatus.

The printing unit 15 has a printer 31, a feeding mechanism 32, and a transfer unit 33, for example, as shown in FIG. 4.

The printer 31 has a thermal head 34, and a platen roller 35 provided opposite to the thermal head 34 and rotated freely in the forward and reverse directions. Between the thermal head 34 and platen roller 35, an ink ribbon 36 having parallel stripes of fused ink of yellow (Y), magenta (M), cyan (C) and black (B), and an intermediate transfer film 37 are interposed.

One end of the ink ribbon 36 is wound around a feed-out shaft 38, and the other end is wound around a take-up shaft 39. At least one of the feed-out shaft 38 and take-up shaft 39 is rotatable independently in both forward and backward directions. The midstream part of the ink ribbon 36 fed out from the feed-out shaft 38 is laid over guide shafts 40 and 41.

Such a fusion thermal transfer system is characterized by high image durability and relative easiness to use functional material (e.g., fluorescent pigment and aluminum-evaporated thin film) as ink material, and suitable for prints to prevent forgery. The ink ribbon 36 may be a single color ink ribbon. The ink ribbon may have ribbon material having a function of a fluorescent pigment ink to emit light when exposed to an ultraviolet ray, a metallic thin film having a shiny surface (aluminum-evaporated) layer for printing, or a hologram layer for printing.

The feeding mechanism 32 feeds the intermediate transfer film 37 at a predetermined speed, and has a first shaft 42 and a second shaft 43, and can feed the intermediate transfer film 37 from one shaft to the other shaft. Namely, one end of the intermediate transfer film 37 is wound around the second shaft 43 provided in the upper side of the printer 31, and the other end is wound around the first shaft 42 provided in the lower side of the printer 31.

The first and second shafts 42 and 43 are independently rotated in both forward and backward directions, and convey the intermediate transfer film 37 to a printing position in the printer 31 and a transfer position in the transfer unit 33 at a predetermined speed.

When the first shaft 42 functions as a take-up shaft to take up the intermediate transfer film 37, the second shaft 43 functions as a feed-out shaft to feed out the intermediate transfer film 37. In this time, the intermediate transfer film 37 is conveyed in the forward direction A. When the second shaft 43 functions as a take-up shaft to take up the intermediate transfer film 37, the first shaft 42 functions as a feed-out shaft to feed out the intermediate transfer film 37. In this time, the intermediate transfer film 37 is conveyed in the reverse direction B.

The feeding mechanism 32 is provided between the platen roller 35 and transfer unit 33, and has a feeding roller 44 to feed the intermediate transfer film 37 with data printed in the printer 31 at a predetermined speed. The feeding roller 44 is rotatable independently in both forward and backward directions, and feeds the intermediate transfer film 37 at a predetermined speed. Namely, the intermediate transfer film 37 feeding speed is determined mainly by the feeding roller 44, and the feeding roller 44 is driven exactly by combining a stepping motor and a reduction mechanism, for example.

Between the first shaft 42 and second shaft 43, the midstream part of the intermediate transfer film 37 is laid over guide shafts 45, 46 and 47, and kept in substantially constant tension. The guide shaft 47 functions as a separation guide, which separates the intermediate transfer film 37 from the passbook 1 after the film is fed through a heating roller 48 described later.

The transfer unit 33 has a heating roller 48, and a backup roller 49 provided opposite to the heating roller 48. The heating roller 48 has a heating heater 50, and a cut side 51 cut partially from the circumference. The peripheral surface of the heating roller is covered with heat-resistant rubber with the thickness of 1-2 mm. The intermediate transfer film 37 is interposed between the heating roller 48 and backup roller 49.

The heating roller 48 can be driven exactly by a DC servomotor or a stepping motor at a predetermined speed. The rotatable backup roller 49 is energized by a not-shown coil spring to apply a certain pressure to a space to the heating roller 48.

In transfer standby mode, the heating roller 48 is placed with the cut side 51 opposed to and substantially parallel to a passbook conveying path 52. Thus, a clearance large enough to place the passbook 1 is formed between the heating roller 48 and backup roller 49. In this time, the intermediate transfer film 37 is desirably placed at the position not contacting the heating roller 48 and backup roller 49, and not contacting the surface of the passbook 1 which comes into when the transfer is started.

The heating roller 48 rotates only when transferring, and contacts the intermediate transfer film 37. Namely, as the printing of the intermediate transfer film 37 is advanced, the intermediate transfer film 37 is conveyed without contacting the heating roller 48 and backup roller 49. During the transfer, at the transfer position (the position where the heating roller 48 and backup roller 49 are contacting), the heating roller 48 and backup roller 49 press the printing surfaces of the intermediate transfer film 37 and passbook 1 by a certain pressure without depending on the thickness of the passbook 1, and heat them by the heat from the heater 50, whereby the image receiving layer (transfer layer) of the intermediate film 37 is transferred from the transfer start position of the intermediate transfer film 37 to the printing surface of the passbook 1.

A tension mechanism 53 is provided between the feeding roller 44 and transfer unit 33. The tension mechanism 53 gives tension to the intermediate transfer film 37 fed by the feeding mechanism 32. Namely, the tension mechanism 53 gives tension to the intermediate transfer film 37 even if the conveyed intermediate transfer film 37 slacks, and can remove the slack.

The passbook conveying path 52 has a first pair of feeding rollers 54, a second pair of feeding rollers 55, and a third pair of feeding rollers 56. The first pair of feeding rollers 54 is provided in the upstream side of the transfer unit 33 in the conveying direction. The second and third pairs of feeding rollers 55 and 56 are provided in the downstream side of the transfer unit 33 in the conveying direction.

The first to third pairs of feeding rollers 54-56 feed the passbook 1 with the printing page opened up to the transfer position of the transfer unit 33. Namely, the first to third pairs of feeding rollers 54-56 rotate in the forward direction, and feed the passbook 1 so that the transfer start position on the printing page of the passbook 1 coincides with the transfer position of the heating roller 48. Further, the first to third pairs of feeding rollers 54-56 rotate in the forward direction, and feed the passbook 1 to the downstream side after being transferred in the transfer unit 33.

On the ink ribbon 36 feeding path, a first sensor 57 is provided to optically detect existence of the ink ribbon 36. On the intermediate film 37 feeding path, a second sensor 58 and a third sensor 59 are provided. The second sensor 58 and third sensor 59 optically detect a bar mark given on the outside surface of the effective area of the intermediate transfer film 37. On the passbook conveying path 52, a fourth sensor 60 and a fifth sensor 61 are provided. The fourth sensor 60 and fifth sensor 61 optically detect the existence of the conveyed passbook 1.

The wireless IC reader/writer unit 13 has feeding rollers 21 to hold and feed the passbook 1 through the conveying path 12. At the position above and separated from the conveying path 12, or at the position opposite to the outside surface of the front cover 3 of the passbook 1 having the buried IC chip 5, a wireless IC reader/writer 22 is provided for wireless data communication with the IC chip 5 through the antenna 6 buried in the front cover 3.

Figure 5:
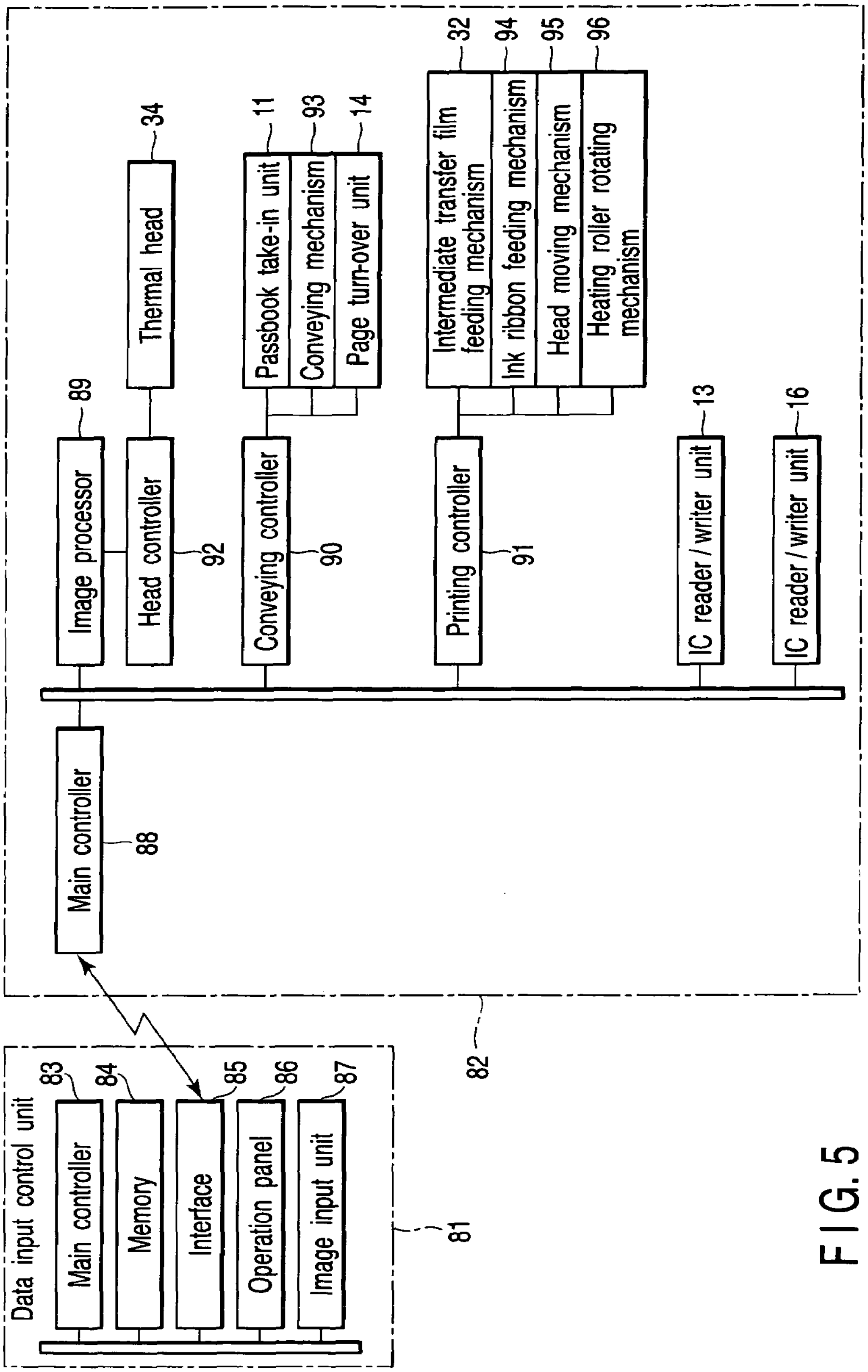
FIG. 5 is a block diagram showing a control system to control the operation of the passbook of FIG. 3.

FIG. 5 is a block diagram showing a control system to control the operation of the passbook.

The control system of the passbook printing apparatus has a data input control unit 81, and a printing unit control unit 82 connected to the data input control unit 81 through a communication line.

The data input control unit 81 has a main controller 83 to control the whole apparatus, a memory 84 storing a control program, an interface 85 to make data transfer with the printing unit control unit 82, an operation panel 86 to accept operation inputs by the operator and display operation guides to the operator, and an image input unit 87 to input a face photograph and images of a registration seal, etc. of the owner of the passbook 1 to be printed. As the image input unit 87, a digital camera, a video camera or a scanner to read a face photograph may be used.

The printing unit control unit 82 has a main controller 88 connected to the interface 85 of the data input control unit 81. The main controller 88 functions as a judgment unit of the present invention. The main controller 88 is connected with an image processor 89 which functions as a printing information generator of the present invention, a conveying controller 90, a printing controller 91, and IC reader/writer units 13 and 16.

The image processor 89 is connected with a head controller 92, which drives and controls the thermal head 34 of the printer 31 based on the printing information (printing information) generated by the image processor 89.

The conveying controller 90 is connected with the passbook take-in unit 11, feeding rollers 21 provided along the conveying path 12, a conveying mechanism 93 to rotate and control the platen roller 35 of the printer 31, and the page turn-over unit 14.

The printing controller 91 is connected with a feeding mechanism 32 to feed the intermediate transfer film 37, an ink ribbon feeding mechanism 94 to rotate and drive the feed-out shaft 38 and take-up shaft 39 to feed the ink ribbon 36, a head moving mechanism 95 to move the thermal head 34 to/from the platen roller 35, and a heating roller rotating mechanism 96 to rotate and control the heating roller 48 and backup roller 49 of the transfer unit 33.

Next, explanation will be given on a passbook printing operation with reference to the flow chart of FIG. 6.

Figure 6:
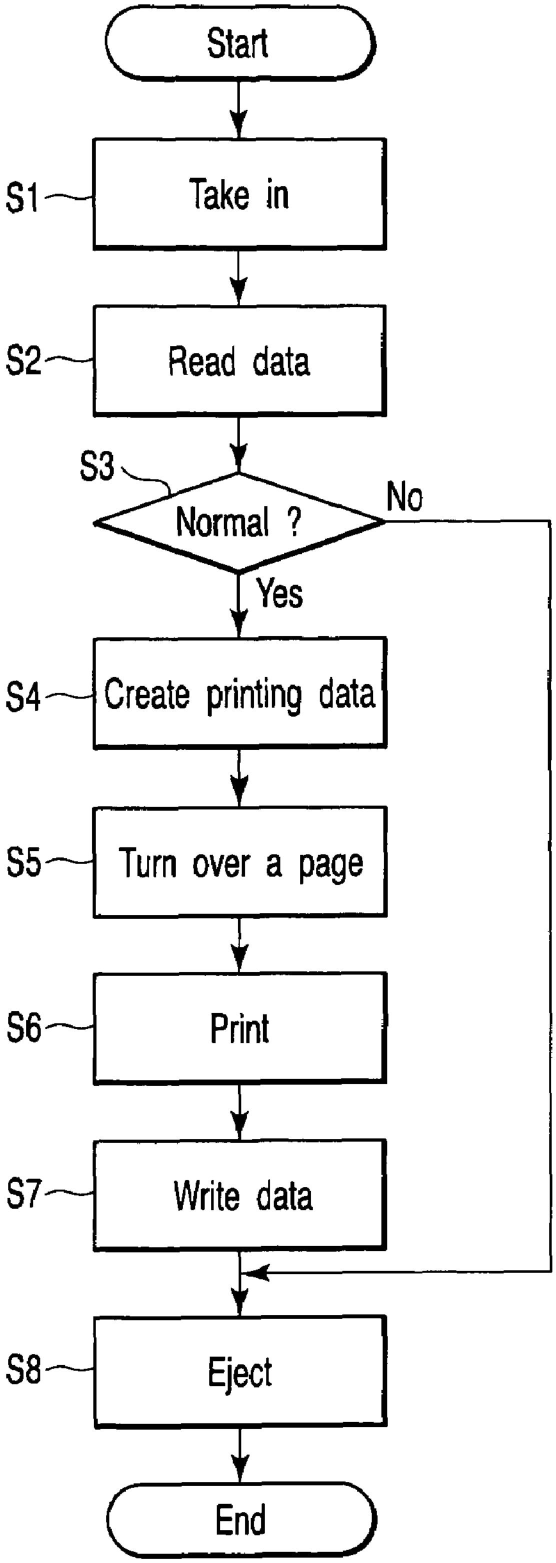
FIG. 6 is a flow chart for explaining the operation of the passbook printing apparatus of FIG. 3.

First, the unused passbook 1 shown in FIG. 1 is take out to the conveying path 12 by the passbook take-in unit 11, and conveyed (FIG. 6, step 1). The passbook 1 taken out to the conveying path 12 is fed to the IC reader/writer unit 13. The IC reader writer unit 13 reads prerecorded electronic data including a passbook number from the IC chip 5 built in the passbook 1, and sends the passbook to the main controller 88 (step 2). The main controller 88 judges whether the IC chip 5 is normal or abnormal based on the data read from the IC chip 5 (step 3).

When the IC chip 5 is judged abnormal as a result of the judgment in step 3 (step 3, NO), a subsequent printing operation is not performed, and the passbook 1 is ejected to the passbook ejection unit 17 (step 8).

When the IC chip 5 is judged normal as a result of the judgment in step 3 (step 3, YES), printing information including the passbook number read from the IC chip is created (step 4). In this time, for example, the image processor 89 creates printing information including security information reflecting the passbook number, by adding the passbook number read from the IC chip to the color face image of the owner of the passbook entered through the image input unit 87 and the private information of the owner entered through the operation panel 86. The created printing information is sent to the head controller 92.

Further, When the IC chip 5 is judged normal as a result of the judgment in step 3 (step 3, YES), the passbook 1 is fed to the page turn-over unit 14, and a desired page is opened (step 5). In this embodiment, as the passbook 1 is conveyed with the front cover 3 with the built-in IC chip 5 set forward, all pages except the front cover 3 are turned over.

The passbook 1 with a desired page opened is fed to the printing unit 15. The printing unit 15 prints the printing information created by the image processor 89 on the printing page 2 of the passbook 1 fed from the page turn-over unit 14, under the control of the printing controller 91 and head controller 92 (step 6).

In this time, the printer 31 first prints the intermediate transfer film 37. Namely, the head controller 92 controls the thermal head 34, and prints a face image and character data (including security information) on the surface of the image receiving layer compatible with a bonding layer of the intermediate transfer film 37, based on the printing information created by the image processor 89. In this time, the printing position of the intermediate film 37 is controlled by the sensor 58 detecting the bar mark of the intermediate transfer film 37 fed from the feed-out shaft 43, and the data is printed at a predetermined position.

The printing information is printed in color by overlaying for colors of Y, M, C and K. In the case of printing by overlaying two or more colors, the intermediate transfer film 37 reciprocates through the thermal head 34 by the same times as the number of colors. The speed of feeding the intermediate transfer film 37 is determined mainly by the platen roller 35. Therefore, the platen roller 35 is driven exactly by combination of a reduction mechanism and a 5-phase stepping motor, for example. The data recorded in this way is a reversed image.

Then, in the transfer unit 33, the recording surface (image receiving layer) of the intermediate transfer film 37 printed by the printer 31 is laid on the printing page 2 of the passbook 1, and pressed and heated by the heating roller 48, whereby the printing information (image receiving layer) and hologram layer 72 are simultaneously transferred. After the transfer is completed, the passbook 1 is fed to the next IC reader/writer unit 16 leaving the printing page 2 opened.

FIG. 2 shows an example of the passbook after the data is printed as described above. In the printing area 2*a* of the printing page 2, the face image 7 of the owner of the passbook 1 is printed in color and character data 8 such as private information is printed in black characters, for example. In the reading area 2*b*, an encrypted specific face image of the owner of the passbook 1, character data such as private information, and bar code data (security information) of a passbook number as identifying information specific to the passbook 1 are printed in black, for example. In this example, security information 10*a* in the bar code data 10 is the security information reflecting the passbook number read from the IC chip 5.

The example of FIG. 2 shows the case that the security information 10 is printed in a visible state. The security information 10 (or only the security information 10*a*) may be printed with fluorescent ink, printed by converting to micro characters, or printed as an electronic watermark. These technologies increase the security effect.

After various data is printed in step 6, finally, the IC reader/writer unit 16 records the data related to the printing information printed on the printing page 2, for example, private information such as a face image, name, registration seal image, account number, financial institution, branch name, personal authentication code, personal identification number of the owner of the passbook 1, as electronic data in the IC chip 5 built in the printed passbook 1 (step 7). After electronic data is recorded in the IC chip 5, the passbook 1 is ejected to the passbook ejection unit 17 (step 8).

As described above, according to the aforementioned embodiments, data can be read from the IC chip 5 of the passbook 1 before printing information on the printing page 2 of the passbook 1, and the data read from the IC chip 5 can be reflected to the printing information. For example, a passbook number specific to the passbook 1 can be read from the IC chip 5, and this passbook number can be printed on the printing page 2 of the passbook 1. This prevents alterations and forgery of the passbook 1.

Further, according to the aforementioned embodiments, when data is not normally read from the IC chip 5 in step 2, the IC chip 5 is judged abnormal and the passbook 1 can be ejected without executing the subsequent printing process. This prevents the waste of intermediate transfer film and ink ribbon, and increases the running cost. Further, in this case, it can be known that the abnormality of the IC chip 5 does not occur during processing in the printing apparatus, and the responsibility of the abnormality of the IC chip 5 can be made clear.

Further, according to the aforementioned embodiments, printing is possible by using invisible data recorded in the IC chip 5, and the security can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, in the aforementioned embodiment, a passbook number specific to the passbook 1 is previously recorded in the IC chip 5 of the passbook 1. As identifying information specific to the passbook 1, a face image and character data such as private information of the owner of the passbook 1 may also be used. In this case, before the identifying information is printed on the printing page 2, the identifying information can be read and reflected on the printing information.

Further, in the aforementioned embodiment, the IC reader/writer unit 16 is provided also in a stage after the printing apparatus 15, and the data related to the printing information printed on the printing page 2 is recorded in the IC chip 5 built in the passbook 1 after being printed. This IC reader/writer unit 16 is not necessarily required, it may be provided if necessary.

Figure 7:
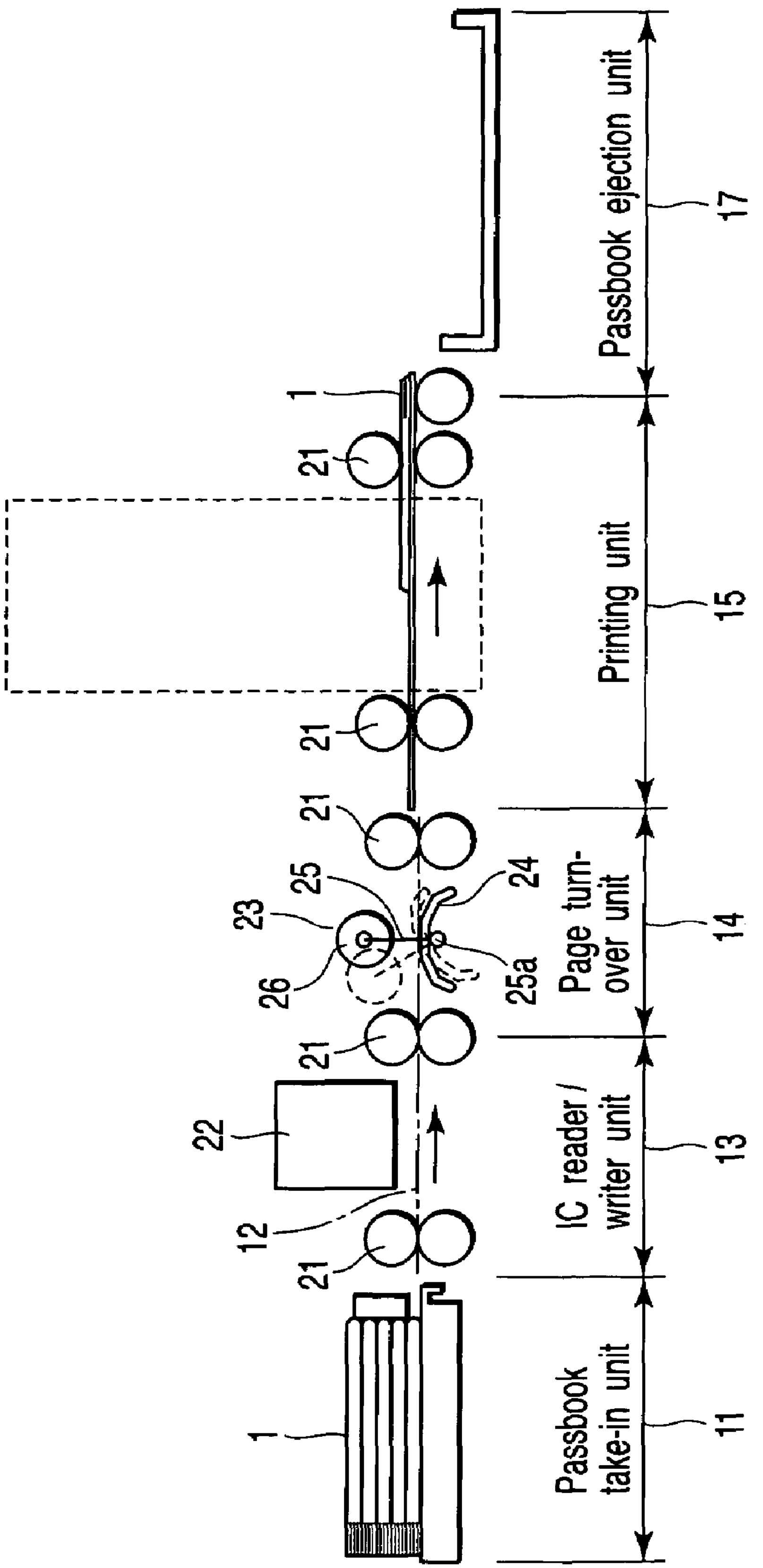
FIG. 7 is a schematic illustration showing a modification of the passbook printing apparatus of FIG. 3.

For example, as shown in FIG. 7, when the IC reader/writer unit 16 is omitted, the passbook 1 with data printed on the printing page 2 may be conveyed reversely to the IC reader/writer unit 13, and necessary data may be written in the IC chip 5. In this case, as the IC reader/writer unit 16 is omitted, the apparatus configuration can be simplified, the apparatus cost can be decreased, and the apparatus installation space can be reduced.

Further, in the aforementioned embodiments, the passbook 1 is taken as an example of a printing medium having a built-in IC chip. A printing medium is not limited to this. The present invention may be applied to an apparatus, which processes other books such as a student's handbook, and card media such as an IC card and an identification card.

What is claimed is:

1. A printing apparatus comprising:

a reader which reads identifying information specific to a printing medium from a memory built in the printing medium, and a printer which prints printing information including the identifying information read by the reader on the printing medium, wherein the printer prints a face image and printing information including private information of the owner of the printing medium on the printing medium, in addition to the identifying information read by the reader.

2. A printing apparatus comprising:

a reader which reads identifying information specific to a printing medium from a memory built in the printing medium; and a printer which prints printing information including the identifying information read by the reader on the printing medium;

wherein the printer prints the printing information in a transfer layer of an intermediate transfer medium, and transfers the transfer layer having the printing information to a printing surface of the printing medium.

3. A printing apparatus comprising:

a reader which reads identifying information specific to a printing medium from a memory built in the printing medium;

a printing information generator which generates printing information including the identifying information read by the reader;

a printer which prints the printing information generated by the printing information generator on the printing medium; and wherein the printing information generator generates a face image and printing information including private information of the owner of the printing medium on the printing medium, in addition to the identifying information read by the reader.

4. A printing apparatus comprising:

a reader which reads identifying information specific to a printing medium from a memory built in the printing medium;

a printing information generator which generates printing information including the identifying information read by the reader;

a printer which prints the printing information generated by the printing information generator on the printing medium; and wherein the printer prints the printing information in a transfer layer of an intermediate transfer medium, and transfers the transfer layer having the printing information to a printing surface of the printing medium.

5. A printing method comprising:

reading identifying information specific to a printing medium from a memory built in the printing medium; and printing printing information including the identifying information read in the reading step on the printing medium, wherein the printer prints a face image and printing information including private information of the owner of the printing medium on the printing medium, in addition to the identifying information read by the reader.

6. A printing method comprising:

reading identifying information specific to a printing medium from a memory built in the printing medium; and printing printing information including the identifying information read in the reading step on the printing medium;

wherein the printer prints the printing information in a transfer layer of an intermediate transfer medium, and transfers the transfer layer having the printing information to a printing surface of the printing medium.

7. The printing apparatus according to claims 1 or 2, further comprising a writer which writes the printing information printed in the printing medium by the printer in the memory built in the printing medium.

8. The printing apparatus according to claims 3 or 4, further comprising a writer which writes the printing information printed in the printing medium by the printer in the memory built in the printing medium.

9. The printing method according to claims 5 or 6, further comprising writing the printing information printed in the printing medium in the memory built in the printing medium.

* * * * *